US009787929B2

(12) United States Patent
Ise

(10) Patent No.: US 9,787,929 B2
(45) Date of Patent: Oct. 10, 2017

(54) IMAGING ELEMENT, IMAGING APPARATUS, ITS CONTROL METHOD, AND CONTROL PROGRAM

(71) Applicant: CANON KABUSHIKI KAISHA, Tokyo (JP)

(72) Inventor: Makoto Ise, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/017,749

(22) Filed: Feb. 8, 2016

(65) Prior Publication Data
US 2016/0156869 A1 Jun. 2, 2016

Related U.S. Application Data

(62) Division of application No. 14/312,862, filed on Jun. 24, 2014, now Pat. No. 9,300,859.

(30) Foreign Application Priority Data

Jun. 28, 2013 (JP) ................................. 2013-137064

(51) Int. Cl.
H04N 5/378 (2011.01)
H04N 5/232 (2006.01)
(Continued)

(52) U.S. Cl.
CPC ........... *H04N 5/378* (2013.01); *H04N 5/2253* (2013.01); *H04N 5/235* (2013.01);
(Continued)

(58) Field of Classification Search
CPC ............................... H04N 5/378; H04N 5/374
See application file for complete search history.

(56) References Cited

U.S. PATENT DOCUMENTS 8,576,294 B2 11/2013 Kameshima et al.
9,300,859 B2 * 3/2016 Ise ..................... H04N 5/23212
(Continued)

FOREIGN PATENT DOCUMENTS

CN 102034841 4/2011
CN 102782840 11/2012
(Continued)

OTHER PUBLICATIONS

Japanese Office Action issued Mar. 7, 2017 during prosecution of related Japanese application No. 2013-137064.
(Continued)

*Primary Examiner* — James Hannett
(74) *Attorney, Agent, or Firm* — Fitzpatrick, Cella, Harper & Scinto

(57) ABSTRACT

An imaging element having a layered structure including a first chip having a pixel portion in which pixels for photo-electrically converting an optical image of an object and generating a pixel signal are arranged two-dimensionally and a second chip in which a drive means of the pixel portion is arranged, and having a first output path to output the pixel signals of at least a first pixel group in the pixel portion and a second output path to output the pixel signals of a second pixel group, comprises the a conversion means for converting the pixel signals of the first and second output paths into digital signals and a control information generation means for generating control information of a photographing operation of the object by using the digital signal converted by the conversion means, wherein at least a part of the conversion means is arranged in the first chip.

24 Claims, 15 Drawing Sheets

(51) Int. Cl.
*H04N 5/369* (2011.01)
*H04N 5/374* (2011.01)
*H04N 5/235* (2006.01)
*H04N 5/225* (2006.01)

(52) U.S. Cl.
CPC ..... *H04N 5/23212* (2013.01); *H04N 5/23241* (2013.01); *H04N 5/23245* (2013.01); *H04N 5/3696* (2013.01); *H04N 5/3742* (2013.01)

(56) References Cited

U.S. PATENT DOCUMENTS

| | | | |
|---|---|---|---|
| 2009/0140122 A1 | 6/2009 | Suzuki | |
| 2009/0310001 A1 | 12/2009 | Masuyama et al. | |
| 2009/0322917 A1 | 12/2009 | Kyogoku et al. | |
| 2011/0080492 A1* | 4/2011 | Matsuda | H01L 27/14603 348/222.1 |
| 2012/0293698 A1* | 11/2012 | Sukegawa | H01L 25/167 348/294 |
| 2014/0320609 A1 | 10/2014 | Stettner et al. | |

FOREIGN PATENT DOCUMENTS

| | | |
|---|---|---|
| JP | 2009-089105 | 4/2009 |
| JP | 2010-283787 | 12/2010 |
| JP | 2011-159958 | 8/2011 |
| JP | 2012-147187 | 8/2012 |
| JP | 2013-51674 | 3/2013 |
| JP | 2013-55589 | 3/2013 |

OTHER PUBLICATIONS

Chinese Office Action issued Feb. 15, 2017 during prosecution of related Chinese application No. 201410302656.9 (Whole English-language translation included.).

* cited by examiner

FIG. 3

| | | | | | | ROW NUMBER | ROWS SELECTED FOR AF | ROWS SELECTED FOR LIVE VIEW |
|---|---|---|---|---|---|---|---|---|
| R | Gr | R | Gr | R | Gr | 1 | ○ | |
| Gb | B | Gb | B | Gb | B | 2 | ○ | |
| R | Gr | R | Gr | R | Gr | 3 | | ○ |
| Gb | B | Gb | B | Gb | B | 4 | | ○ |
| R | Gr | R | Gr | R | Gr | 5 | | ○ |
| Gb | B | Gb | B | Gb | B | 6 | | ○ |
| R | Gr | R | Gr | R | Gr | 7 | | ○ |
| Gb | B | Gb | B | Gb | B | 8 | | ○ |

FIG. 10
| | CONVERSION RESOLVING POWER [NUMBER OF BITS] | CONVERSION GAIN [TIMES] | CONVERSION TIME [μsec] |
|---|---|---|---|
| WHEN SELECTING ROWS FOR LIVE VIEW | 10 | 1 | 8 |
| WHEN SELECTING ROWS FOR AF | 8 | K | 2 * k |
FIG. 11A
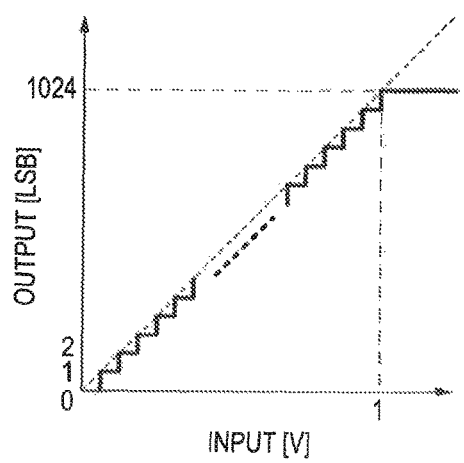
FIG. 11B
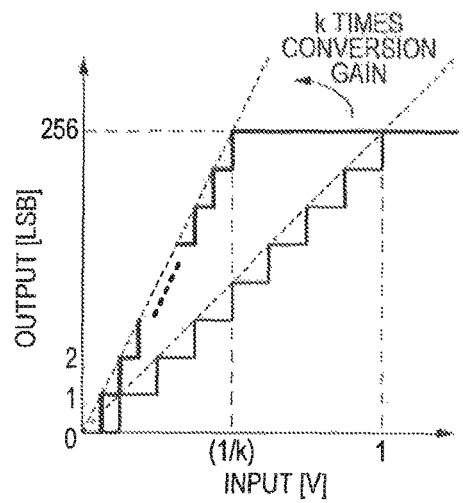
FIG. 12
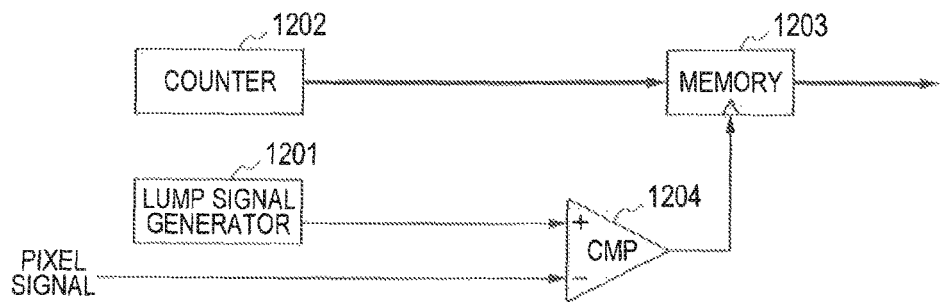

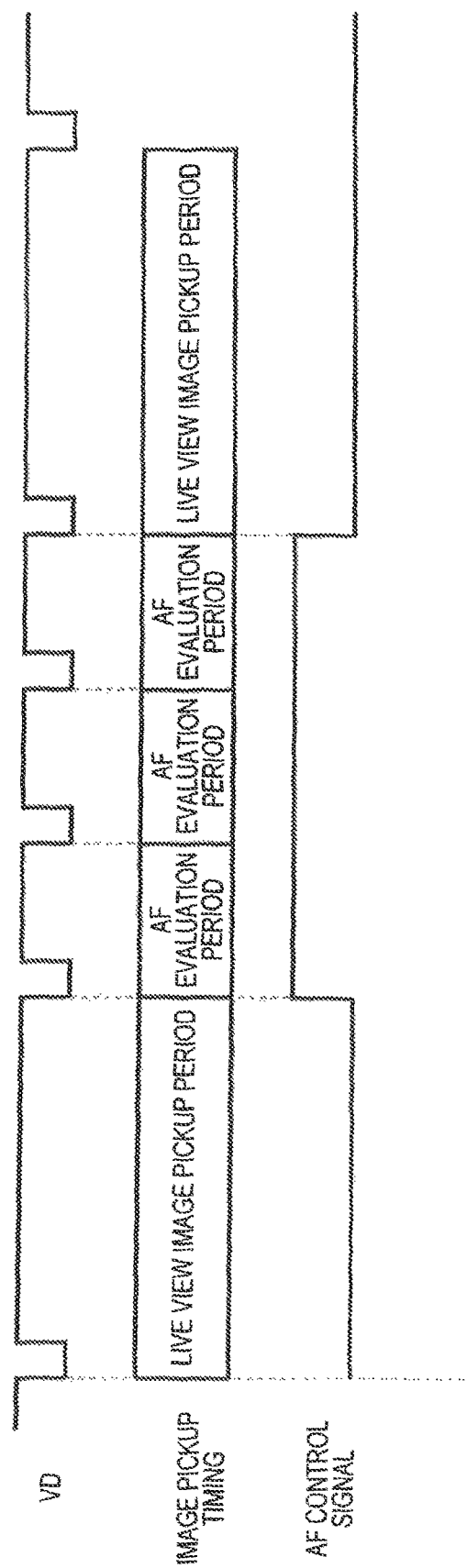

IMAGING ELEMENT, IMAGING APPARATUS, ITS CONTROL METHOD, AND CONTROL PROGRAM

This application is a division of application Ser. No. 14/312,862 filed Jun. 24, 2014.

BACKGROUND OF THE INVENTION

Field of the Invention

The present invention relates to an imaging element having a layered structure and an imaging apparatus having the imaging element and, more particularly, to an imaging element having such a construction that an evaluation value for photometry, distance measurement, and the like are detected in accordance with image data.

Description of the Related Art

In the related arts, when obtaining position information of an object which is used in focus control in an imaging apparatus, the position information is obtained on the basis of an image signal which is output from an imaging element. There is also used a method whereby an optical signal from an object is directly input to a dedicated detecting apparatus and position information is obtained on the basis of a phase difference in an image shown by the optical signal. In the case of obtaining position information on the basis of image data, since the dedicated detecting apparatus is unnecessary, the imaging apparatus can be miniaturized.

FIG. 16 is a diagram for describing timing for the autofocus image pickup operation (AF evaluation image pickup) at the time of a live view in the imaging apparatus in the related arts. As illustrated in the diagram, in the imaging apparatus in the related arts, image pickup timing is specified by a vertical sync signal (Vertical Driving Pulse: VD). When an AF control signal is turned on, an image for AF evaluation is picked up in response to the VD after a live view image pickup period. When the AF control signal is turned off, the apparatus enters the live view image pickup period again.

As mentioned above, since the live view image pickup period for obtaining the image for live view and the AF operation period for obtaining the image for AF evaluation are serially arranged along a time base, the image for live view and the image for AF evaluation are not simultaneously picked up. Therefore, as illustrated in the diagram, since the image for AF evaluation is picked up for the AF operation period locating between the image pickup periods (frames) of the image for live view, a time lag exists between the image for live view and the image for AF evaluation.

In addition, although the live view display is performed even when the image for AF evaluation is picked up, at this time, the live view display is performed on the basis of the image for AF evaluation. As illustrated in FIG. 7, when the image for AF evaluation is picked up, since a frame rate is set to be higher than the live view image pickup period, a thinning-out rate in the read-out of the imaging element is high and a deterioration in image quality cannot be avoided.

In order to avoid such a drawback, for example, there is a construction in which a pixel for focus signal detection is provided in a pixel portion of the imaging element separately from a pixel for an image pickup signal. According to such a construction, the apparatus has not only a read-out mode for live view in which the signal for image pickup for a live view display is read out but also a read-out mode for focus detection and autoexposure (AE) in which the signal for focus detection and the signal for image pickup to be used for photometry information for autoexposure are read out of the imaging element. Such read-out modes are circulatively and repetitively performed every frame (refer to Japanese Patent Application Laid-Open No. 2009-89105).

However, in Japanese Patent Application Laid-Open No. 2009-89105, since the image signal (that is, charges) is read out from the imaging element on a pixel unit basis, not only it takes a time to transfer the charges but also a transfer data amount increases, thereby increasing electric power consumption. Further, since the image signal serving as an output of the imaging element is processed by another control apparatus or the like, if the transfer data amount is large, a processing burden in the control apparatus increases. In addition, in Japanese Patent Application Laid-Open No. 2009-89105, since the pixel for focus signal detection is provided in the pixel portion, an area of the pixel for the image pickup signal is eventually reduced and the pixel for focus signal detection is not used when obtaining the image pickup signal (image signal), so that the image quality deteriorates.

SUMMARY OF THE INVENTION

It is, therefore, an aspect of the invention to provide an imaging element in which a data transfer time is shortened and image quality does not deteriorate.

To accomplish the above aspect, according to the invention, an imaging element having a layered structure which includes a first chip having a pixel portion in which pixels each for photoelectrically converting an optical image of an object and generating a pixel signal are arranged in a matrix form and a second chip in which a drive unit of the pixel portion is arranged and having a first output path for outputting the pixel signals of at least a first pixel group in the pixel portion and a second output path for outputting the pixel signals of a second pixel group, comprising: a conversion unit configured to convert the pixel signals of the first output path and the second output path into digital signals; and a control information generation unit configured to generate control information of a photographing operation of the object by using the digital signal converted by the conversion unit, wherein at least a part of the conversion unit is arranged in the first chip.

According to another aspect of the invention, there is also provided an imaging apparatus comprising: a photographing optical system for forming an optical image of an object; the foregoing imaging element for picking up the optical image; a control unit configured to control driving of the imaging element in accordance with an image pickup mode of the imaging apparatus; and a display unit configured to display an image on the basis of the digital signal of the first output path of the imaging element driven by the control unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a diagram for describing a pixel selection in a first chip of the imaging element according to the first embodiment of the invention.

FIG. 10 is a diagram illustrating an example of a setting of AD conversion conditions when selecting rows for live view and when selecting rows for AF in the imaging element according to the third embodiment of the invention.

FIGS. 11A and 11B are diagrams illustrating input/output characteristics of an AD conversion when selecting rows for live view and when selecting rows for AF in the imaging element according to the third embodiment of the invention.

FIG. 12 is a block diagram illustrating a construction of a column AD converter of an imaging element according to the fourth embodiment of the invention.

FIG. 16 is a diagram illustrating timing for the autofocus image pickup operation in the live view operation in an imaging apparatus in the related arts.

DESCRIPTION OF THE EMBODIMENTS

Preferred embodiments of the present invention will now be described in detail in accordance with the accompanying drawings.

Various exemplary embodiments, features, and aspects of the present invention will be described in detail below with reference to the drawings.

First Embodiment

Figure 1:
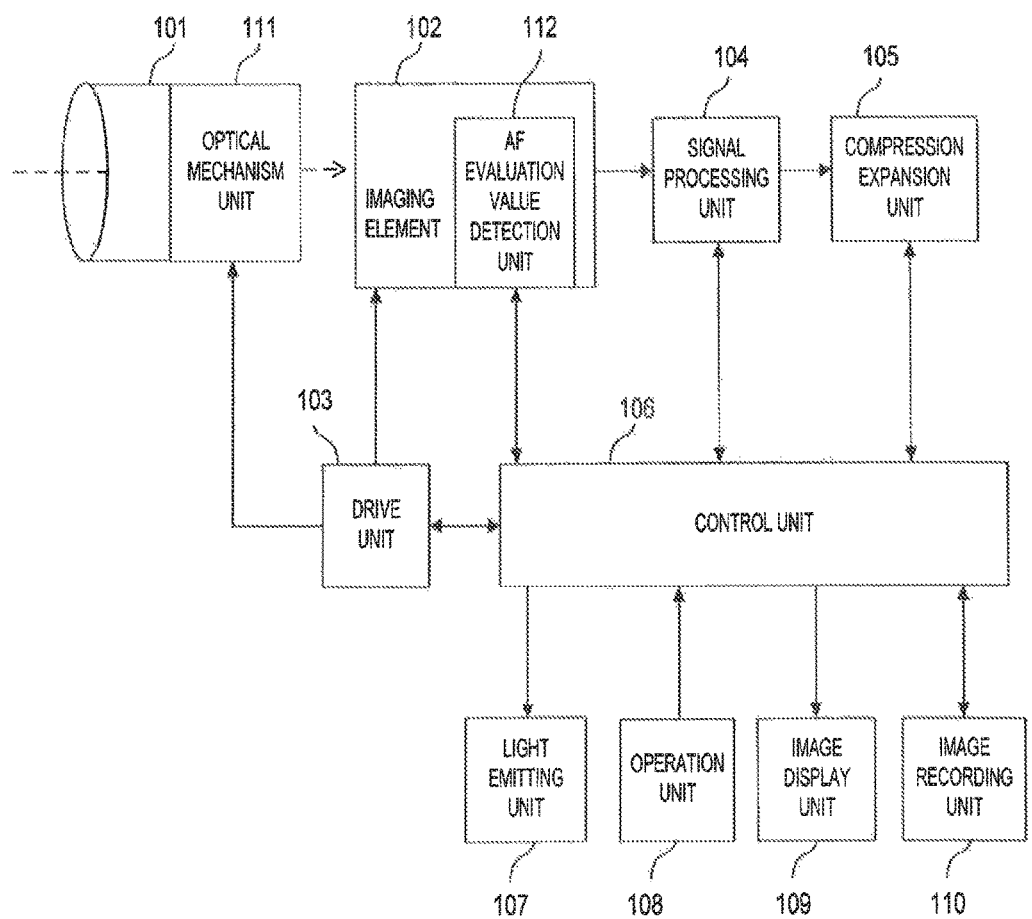
FIG. 1 is a block diagram illustrating a construction of an imaging apparatus using an imaging element according to the first embodiment of the invention.

FIG. 1 is a block diagram illustrating a construction of an imaging apparatus having an imaging element according to the first embodiment of the invention. The illustrated imaging apparatus is applied to, for example, a digital still camera with a moving image function or a video camera.

In the diagram, an imaging apparatus 100 has an optical barrel 101, an imaging element 102, a drive unit 103, a signal processing unit 104, a compression expansion unit 105, a control unit 106, a light emitting unit 107, an operation unit 108, an image display unit 109, and an image recording unit 110.

The optical barrel 101 has a lens unit (not shown; hereinbelow, simply called a lens) serving as a photographing optical system and an optical mechanism unit 111. The lens converges (that is, focuses) light (optical image) from an object onto the imaging element 102. Although not shown, the optical mechanism unit 111 has an AF mechanism, a zoom driving mechanism, a mechanical shutter mechanism, an iris mechanism, and the like. The optical mechanism unit 111 is driven by the drive unit 103 under control by the control unit 106.

The imaging element 102 according to the present embodiment has a pixel portion 201, which will be described hereinafter, and an A/D converter (not shown) and is a CMOS type image sensor of what is called an XY read-out type. The imaging element 102 executes the image pickup operation such as exposure, signal read-out, reset, and the like by the drive unit 103 which operates under control by the control unit 106, and outputs an image pickup signal (also referred to as an image signal). An AF evaluation value detection unit 112 is provided for the imaging element 102. On the basis of contrast information and phase difference information which are obtained from the image signal obtained by the imaging element 102, the AF evaluation value detection unit 112 detects an AF evaluation value (autofocus evaluation value) at timing which is controlled by the control unit 106. The AF evaluation value detection unit 112 outputs the AF evaluation value to the control unit 106.

The signal processing unit 104 executes signal processings such as white balance adjustment processing, color correction processing, AE (Auto Exposure) processing, and the like to the image signal which is an output of the imaging element 102, under control by the control unit 106 and outputs as image data. The compression expansion unit 105 operates under control by the control unit 106. The compression expansion unit 105 executes a compression coding processing to the image data which is an output of the signal processing unit 104, by a predetermined still image data format such as a JPEG (Joint Photographic Coding Experts Group) method or the like. The compression expansion unit 105 executes an expansion decoding processing to the coded image data transmitted from the control unit 106. The compression expansion unit 105 may execute the compression coding/expansion decoding processing to moving image data by an MPEG (Moving Picture Experts Group) method or the like.

The control unit 106 is, for example, a micro controller having a CPU (Central Processing Unit), a ROM (Read Only Memory), a RAM (Random Access Memory), and the like. The CPU integratedly controls the whole imaging apparatus 100 by executing a program stored in the ROM.

If it is determined that an exposure value of the object is small by the AE processing by the signal processing unit 104, the light emitting unit 107 irradiates light to the object to illuminate the object. As a light emitting unit 107, for example, a strobe apparatus using a xenon tube or an LED light emitting apparatus is used.

The operation unit 108 has, for example, various kinds of operation keys such as a shutter release button and the like, a lever, and a dial and transmits an operation signal corresponding to the input operation of the user to the control unit 106.

The image display unit 109 has, for example, a display device such as an LCD (Liquid Crystal Display) or the like and an interface circuit for the LCD and displays an image shown by the image data transmitted from the control unit 106 to the display device. The image recording unit 110 is, for example, a recording medium such as portable semiconductor memory, optical disk, HDD (Hard Disk Drive), magnetic tape, or the like and stores the image data, as an image file, which is compression-coded by the compression expansion unit 105. The image recording unit 110 reads out the image file designated by the control unit 106 and outputs to the control unit 106.

The fundamental operation of the imaging apparatus 100 illustrated in FIG. 1 will now be described. The imaging apparatus in the present embodiment has a still image photographing mode and a moving image photographing mode as photographing modes which can be set by the operation of the operation unit 108 and has a function for reproducing and displaying the images which are photographed and recorded in those photographing modes.

For example, when a still image is photographed, in the imaging element 102 prior to the image pickup, a CDS processing and an AGC processing are sequentially executed to the image signal which is output from a pixel 201 and, thereafter, the obtained signal is converted into a digital image signal by an A/D converter. The digital image signal is output to the AF evaluation value detection unit 112 and the signal processing unit 104.

On the basis of contrast information obtained from the digital image signal, the AF evaluation value detection unit 112 calculates an AF evaluation value (control information) and outputs the AF evaluation value to the control unit 106. The control unit 106 decides a control amount of the optical mechanism unit 111 on the basis of the AF evaluation value and controls the drive unit 103 in accordance with the control amount. Thus, the optical mechanism unit 111 is driven by the drive unit 103.

The signal processing unit 104 executes, for example, an image quality correction processing to the digital image signal, generates a camera through image signal, and transmits the camera through image signal to the image display unit 109 through the control unit 106. Thus, the image display unit 109 displays the camera through image expressed by the camera through image signal. The user can perform an image angle adjustment while observing the camera through image.

When a shutter release button of the operation unit 108 is depressed in this state, the image pickup signal (digital image signal) of one frame is sent to the signal processing unit 104 from the imaging element 102 by the control of the control unit 106. The signal processing unit 104 executes the image quality correction processing to the digital image signal of one frame and transmits the digital image signal (image data) obtained after the processing to the compression expansion unit 105. The compression expansion unit 105 compression-codes the image data and transmits the coded image data to the image recording unit 110 through the control unit 106. Thus, an image file corresponding to the picked-up still image is recorded in the image recording unit 110.

When the image file recorded in the image recording unit 110 is reproduced, the control unit 106 reads out the selected image file from the image recording unit 110 in accordance with an operation input from the operation unit 108. The control unit 106 sends the read-out image file to the compression expansion unit 105 and allows the compression expansion unit 105 to execute the expansion decoding processing. The decoded image data is sent to the image display unit 109 through the control unit 106. Thus, a still image corresponding to the image data is reproduced and displayed on the image display unit 109.

When moving image data is recorded, the digital image signal which is output from the imaging element 102 is input to the signal processing unit 104 by the control of the control unit 106. The image data which is sequentially processed in the signal processing unit 104 is compression-coded by the compression expansion unit 105. The coded moving image data is sequentially transferred from the compression expansion unit 105 to the image recording unit 110 and is recorded as a moving image file.

When the moving image file recorded in the image recording unit 110 is reproduced, the control unit 106 reads out the selected moving image file from the image recording unit 110 in accordance with an operation input from the operation unit 108. The control unit 106 sends the read-out moving image file to the compression expansion unit 105 and allows the compression expansion unit 105 to execute the expansion decoding processing. The decoded moving image data is sent to the image display unit 109 through the control unit 106. Thus, a moving image corresponding to the moving image data is reproduced and displayed on the image display unit 109.

As will be obviously understood from the above description, in the example illustrated in FIG. 1, the control unit 106 and the drive unit 103 function as a control unit and a read-out control unit. The control unit 106 and the image display unit 109 function as a display control unit.

Figure 2A:
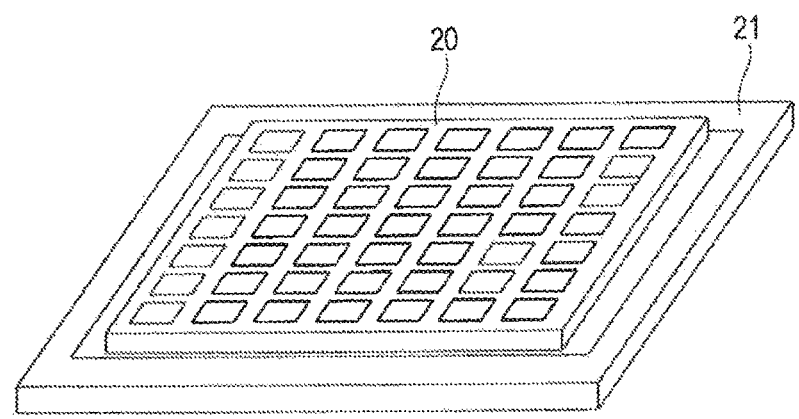
FIGS. 2A and 2B are diagrams for describing a construction of the imaging element according to the first embodiment of the invention.
Figure 2B:
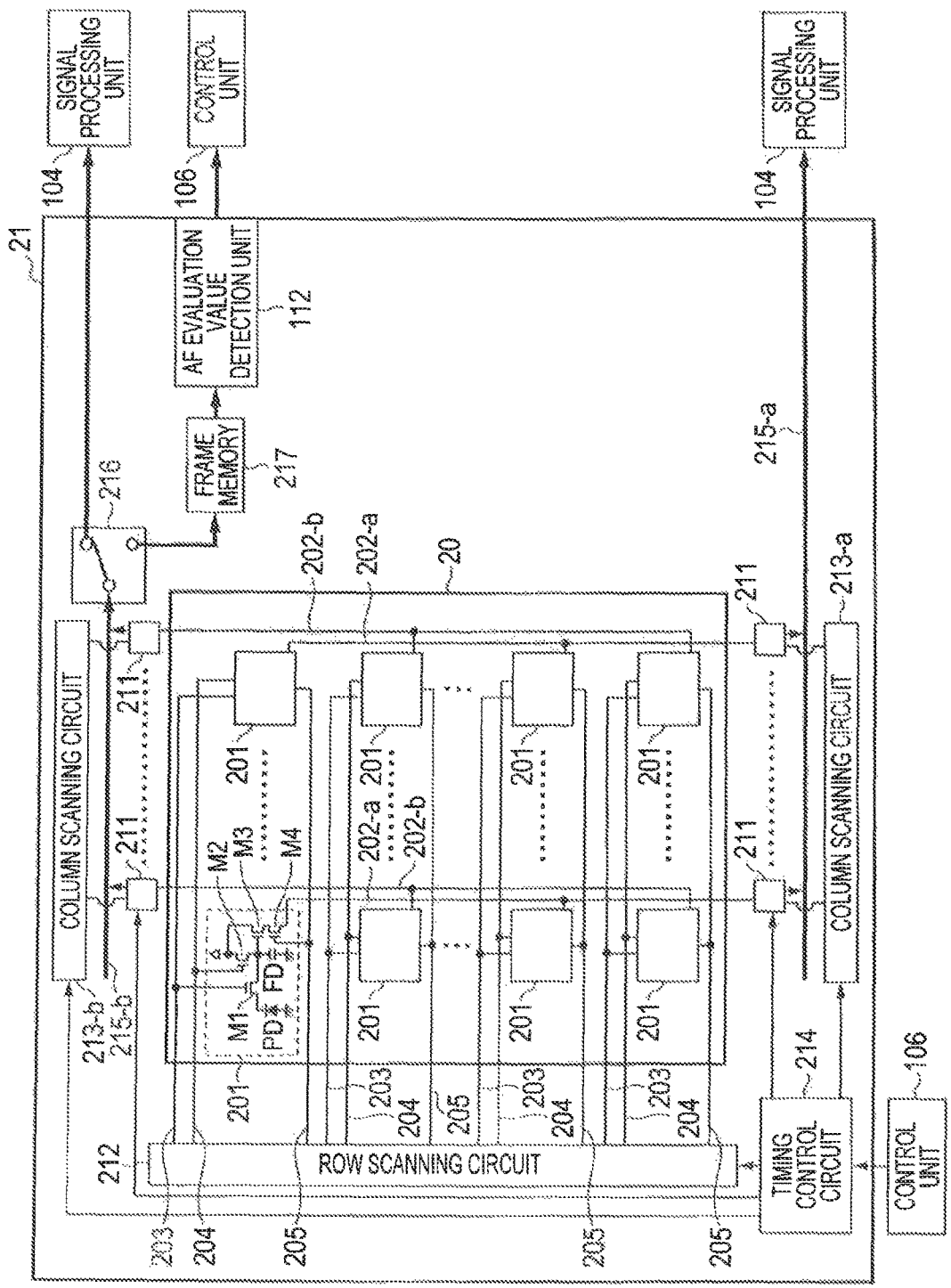

FIGS. 2A and 2B are diagrams for describing a construction of the imaging element 102 according to the present embodiment. FIG. 2A is a perspective view of the imaging element in the present embodiment. FIG. 2B is a block diagram illustrating the construction of the imaging element.

In FIG. 2A, the imaging element 102 has a first chip 20 and a second chip 21 and the first chip 20 is layered on the second chip 21. The first chip 20 has the plurality of pixels 201 arranged in a matrix form. The first chip 20 is layered in such a manner that a pixel array faces a light incident side (that is, it is located on a light receiving side of an optical image). Pixel drive circuits such as column scanning circuits 213-a and 213-b, row scanning circuit 212, and the like are formed on the second chip 21, and the foregoing AF evaluation value detection unit 112 is also formed.

As mentioned above, if the pixels 201 are formed on the first chip 20 and the pixel drive circuits and the AF evaluation value detection unit 112 are formed on the second chip 21, a manufacturing process of peripheral circuits of the imaging element 102 and the pixel portion can be separated. Thus, narrowing of a wire width in the peripheral circuits, a high operation speed caused by highly-increasing a wire density, reducing a device size, and a high functionality can be planned.

As illustrated in FIG. 2B, on the first chip 20, the pixels 201 are arranged in a matrix form and each pixel 201 is connected to a transfer signal line 203, a reset signal line 204, and a row selection signal line 205 in the horizontal direction (row direction). Each pixel 201 is also connected to column signal lines 202-a and 202-b in the vertical direction (column direction). Each of the column signal lines 202-a and 202-b connects the pixels to different read-out destinations on a row unit basis.

As illustrated in the diagrams, each of the pixels 201 has a photo diode PD serving as a photoelectric conversion element, a transfer transistor M1, a reset transistor M2, an amplifying transistor M3, a selecting transistor M4, and a floating diffusion FD. In the example illustrated in the diagrams, each of the transistors is an n-channel MOSFET (MOS Field-Effect Transistor).

The transfer signal line 203, reset signal line 204, and row selection signal line 205 are connected to gates of the transfer transistor M1, reset transistor M2, and selecting transistor M4, respectively. Those signal lines 203 to 205 extend in the horizontal direction to simultaneously drive the pixels on the same row. Consequently, a rolling shutter of a line-sequential operation type or a global shutter of a whole-line simultaneous operation type can be controlled. Further, the column signal line 202-a or 202-b is connected to a source of the selecting transistor M4 on a row unit basis.

The photo diode PD accumulates the charges generated by the photoelectric conversion. A P-side of the photo diode PD is connected to a ground and an N-side is connected to a source of the transfer transistor M1. When the transfer transistor M1 is turned on, the charges in the photo diode PD are transferred to the FD. Since a parasitic capacitance exists in the FD, the charges transferred to the FD are accumulated.

A power source voltage Vdd is applied to a drain of the amplifying transistor M3 and its gate is connected to the FD. The amplifying transistor M3 amplifies the charges (that is, voltage) of the FD to convert into a voltage signal. The selecting transistor M4 selects the signal reading-out pixels on a row unit basis by the row selection signal line 205. A drain of the selecting transistor M4 is connected to a source of the amplifying transistor M3. The source of the selecting transistor M4 is connected to the column signal lines 202.

When the selecting transistor M4 is turned on by the row selection signal line 205, a voltage signal corresponding to the voltage of the FD is output to the column signal lines 202. The power source voltage Vdd is applied to a drain of the reset transistor M2 and its source is connected to the FD. When the reset transistor M2 is turned on by the reset signal line 204, the voltage of the FD is reset to the power source voltage Vdd.

A column ADC block 211 is arranged on the second chip 21 every column arrangement of the pixels 201 and the column ADC 211 is connected to the column signal line 202-a or 202-b. Further, the row scanning circuit 212, the column scanning circuits 213-a and 213-b, a timing control circuit 214, horizontal signal lines 215-a and 215-b, a change-over switch 216, a frame memory 217, and the AF evaluation value detection unit 112 are disposed on the second chip 21.

The timing control circuit 214 controls operation timing of the row scanning circuit 212, column scanning circuits 213-a and 213-b, column ADC block 211, and switch 216 under control of the control unit 106. The row scanning circuit 212 scans each row. Each of the column scanning circuits 213-a and 213-b scans each column. The horizontal signal lines 215-a and 215-b transfer output signals (image signals) of the column ADC blocks 211 at timing which are controlled by the column scanning circuits 213-a and 213-b.

The frame memory 217 temporarily stores the image signal which is output from the horizontal signal line 215-b. The AF evaluation value detection unit 112 detects an AF evaluation value in accordance with the image signal stored in the frame memory 217 and sends the AF evaluation value to the control unit 106. The change-over switch 216 is a switch for selectively outputting the image signal which is output to the horizontal signal line 215-b to one of the AF evaluation value detection unit 112 and the signal processing unit 104. The image signal transferred to the horizontal signal line 215-a is sent to the signal processing unit 104.

FIG. 3 is a diagram for describing a selection construction to read out the pixels to the column signal line 202-a or 202-b in the first chip 20 illustrated in FIGS. 2A and 2B. In FIG. 3, for example, it is assumed that the pixel portion of (6 rows×8 columns) is illustrated and the respective pixels are arranged according to the Bayer array.

When the apparatus enters a focus control mode by the operation of the operation unit 108 illustrated in FIG. 1, the control unit 106 separates the reading-out rows of the imaging element 102 so that the image pickup for live view and the image pickup for detection of the AF evaluation value can be simultaneously performed. That is, the change-over switch 216 is switched so that the horizontal signal line 215-b is connected to the frame memory 217. Thus, the image signal for live view is output to the column signal line 202-a and the image signal for detection of the AF evaluation value is output to the column signal line 202-b.

In FIG. 3, row numbers 1 and 2 indicate rows to pick up the image for detection of the AF evaluation value and row numbers 3 to 8 indicate rows to pick up the image for live view. In the example illustrated in the diagram, the read-out scan is sequentially performed on a row unit basis and the read-out scan is repetitively performed on a 8-row unit basis.

In the image pickup for detection of the AF evaluation value, three pixels are read out among four pixels of a same color in the vertical direction in a thinning-out manner to attach importance to a frame rate. On the other hand, in the image pickup for live view, one pixel is thinned out among four pixels of a same color in the vertical direction and three pixels are added to attach importance to image quality. In other words, in the pickup of the image for detection of the AF evaluation value, a first pixel group is read out at a first frame rate. In the pickup of the image for live view, a second pixel group is read out at a second frame rate slower than the first frame rate.

By separately performing the image pickup for AF scanning and the image pickup for live view every selected rows as mentioned above, the image signals of the frame rates of different data sizes can be obtained for different charge accumulation times.

Voltage signals (analog signals) which are output from the column signal lines 202-a and 202-b are converted from the analog signals into digital signals (image signals) by the column ADC blocks 211 illustrated in FIGS. 2A and 2B. The image signals as outputs of the column ADC blocks 211 are read out from the column ADC blocks 211 to the horizontal signal line 215-a or 215-b by the column scanning circuit 213-a or 213-b. The image signals which are read out to the horizontal signal line 215-a are sent to the signal processing unit 104. The image signals which are read out to the horizontal signal line 215-b are output to the switch 216 and are output to the signal processing unit 104 or the frame memory 217 under control by the control unit 106. The switching operation by the change-over switch 216 is performed on a frame unit basis.

In the AF evaluation mode (that is, autofocus control mode), the image signals are recorded from the horizontal signal line 215-b into the frame memory 217 through the change-over switch 216. At this time, the AF evaluation value detection unit 112 detects the AF evaluation value on the basis of contrast information in the image signals recorded in the frame memory 217. The AF evaluation value is sent from the AF evaluation value detection unit 112 to the control unit 106.

In the following description, at the time of image pickup, an output path established by the column signal line 202-a and the horizontal signal line 215-a is called "channel Ch1"

and an output path established by the column signal line 202-*b* and the horizontal signal line 215-*b* is called "channel Ch2".

Figure 4:
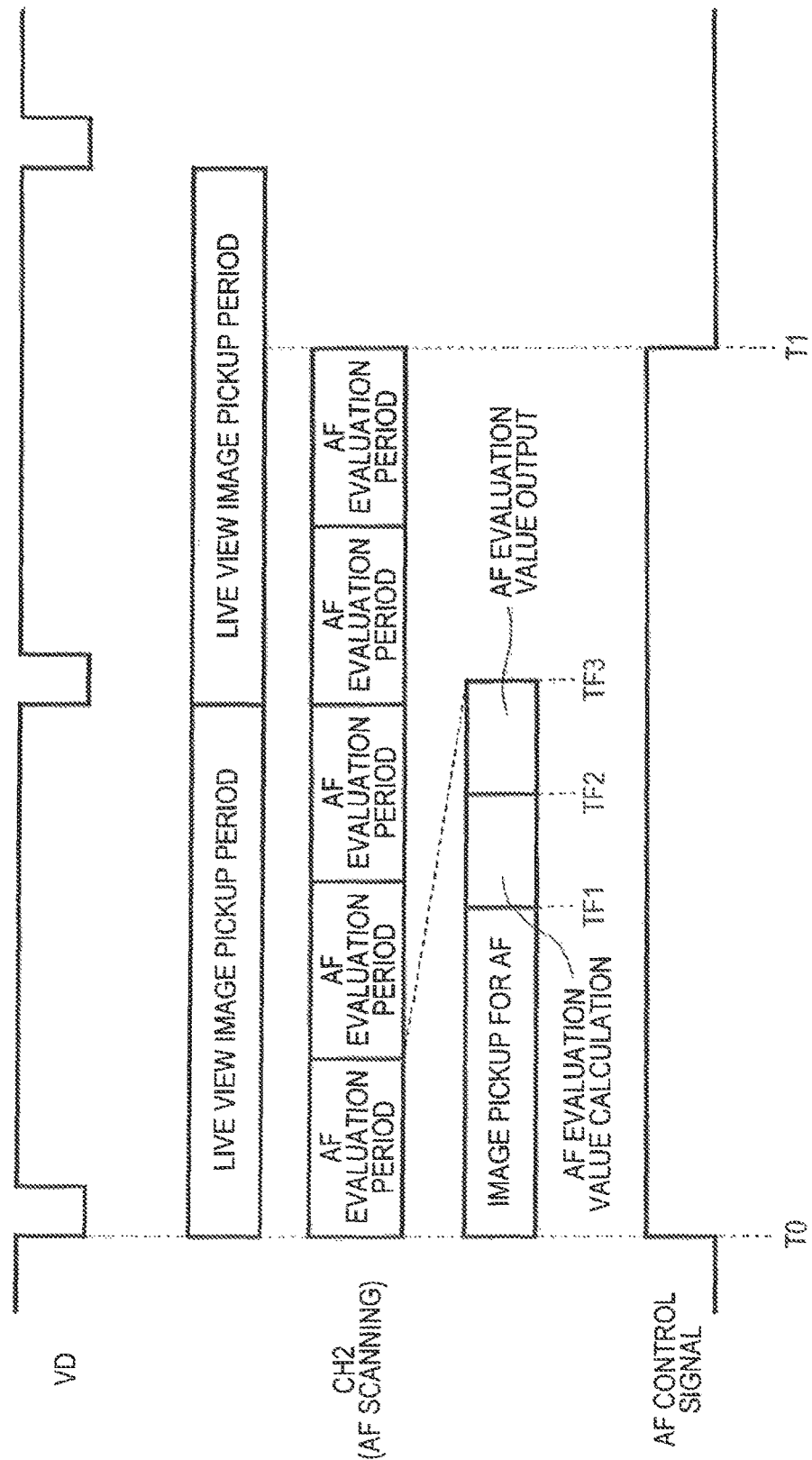
FIG. 4 is a diagram illustrating image pickup timing in an AF evaluation mode of the imaging apparatus in the first embodiment of the invention.

FIG. 4 is a diagram illustrating image pickup timing in the AF evaluation mode in the camera 100 illustrated in FIG. 1.

As illustrated in the diagram, image pickup timing is specified by the vertical driving pulse (VD). If the AF evaluation mode is set, the control unit 106 raises the AF control signal (to the H level) in response to a trailing edge of the vertical driving pulse VD at time T0. Subsequently, when the vertical driving pulse VD rises, the control unit 106 simultaneously starts the live view image pickup using the channel Ch1 and the image pickup for AF evaluation using the channel Ch2 synchronously with the vertical driving pulse VD.

For a period of time of T0~TF1, the image signals for AF evaluation which are read out of the pixel portion 201 through the channel Ch2 are stored into the frame memory 217 through the horizontal signal line 215-*b* and the change-over switch 216. For a period of time of TF1~TF2, the AF evaluation value detection unit 112 calculates an AF evaluation value by using the image signals for AF stored in the frame memory 217. After that, for a period of time of TF2~TF3, the AF evaluation value detection unit 112 outputs the AF evaluation value to the control unit 106.

The control unit 106 compares the AF evaluation value with a predetermined AF expected value. When the AF evaluation value satisfies a predetermined condition with the AF expected value, the control unit 106 lowers the AF control signal (time T1). When the AF control signal trails, only the image pickup for AF evaluation is stopped and the live view image pickup is continuously performed.

In the example illustrated in the diagram, for the period of time of the one vertical driving pulse VD, the image for live view is picked up by one frame and the images for AF evaluation (AF scan) are picked up by three frames. When the control unit 106 sets the AF control signal to the L level (time T1), the AF evaluation is finished.

In the imaging apparatus having the imaging element according to the present embodiment mentioned above, in the AF evaluation mode, there is no need to send the image data to the control unit 106 through the signal processing unit 104 and obtain the AF evaluation value. That is, since the AF evaluation value of a small data capacity is directly output from the imaging element 102 to the control unit 106, the electric power can be reduced due to a decrease in processing burden.

Figure 5:
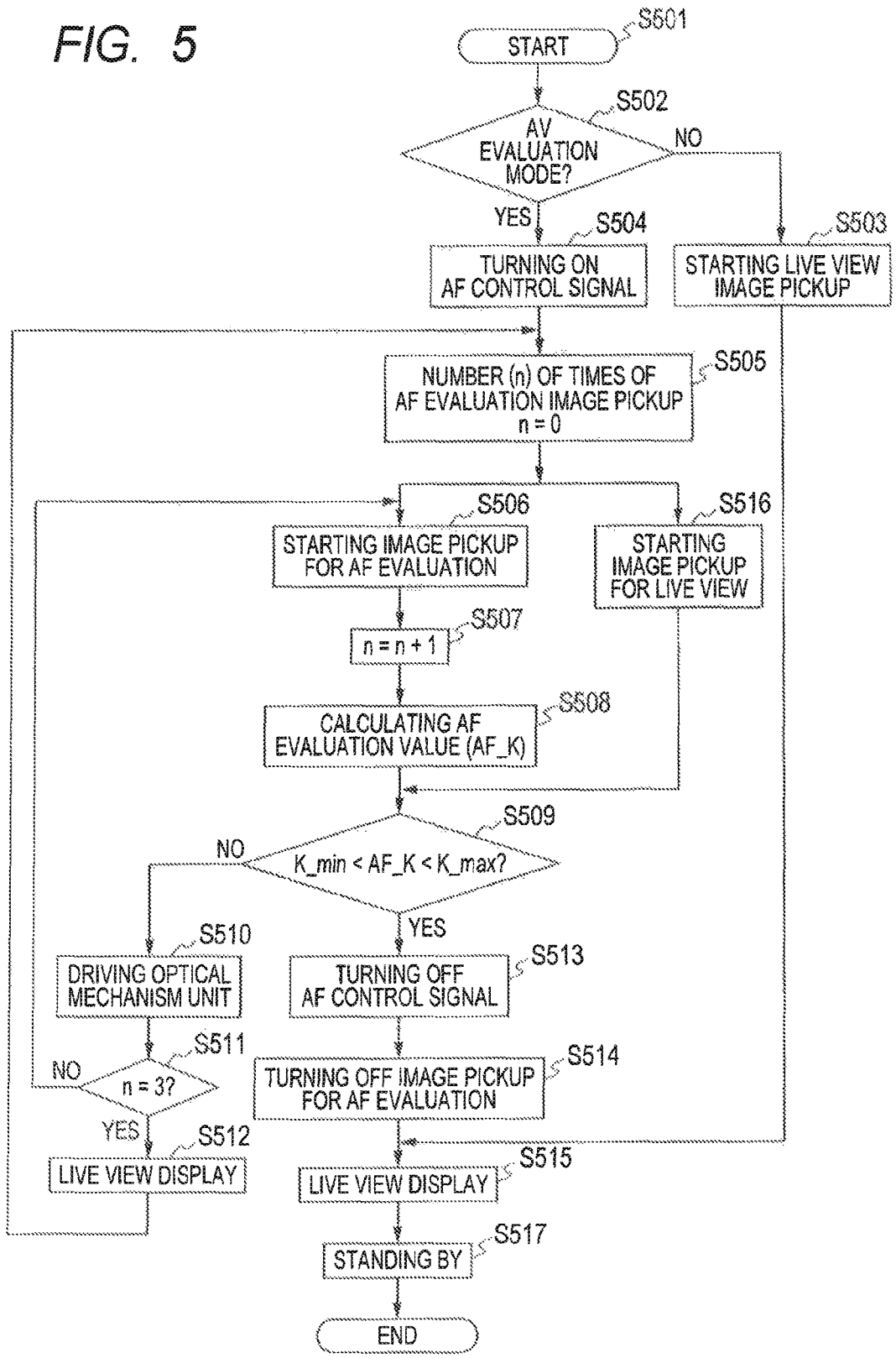
FIG. 5 is a diagram illustrating a flowchart for the control operation of the imaging apparatus in the first embodiment of the invention.

FIG. 5 is a diagram illustrating a flowchart for the live view control operation in the photographing operation of the imaging apparatus 100 in the present embodiment. The control operation according to the flowchart illustrated in the diagram is realized by a method whereby the control unit 106 executes a program to control each unit.

When a power supply of the camera 100 is turned on and the camera enters a standby state, that is, a photographing preparation state before image pickup, the control unit 106 discriminates whether or not the camera is in the AF evaluation mode (step S502). That is, the control unit 106 discriminates whether or not the AF evaluation mode is set. If the AF evaluation mode is not set (NO in step S502), the control unit 106 starts the live view image pickup (step S503) and advances to step S515, which will be described hereinafter. If the AF evaluation mode is set (YES in step S502), the control unit 106 turns on the AF control signal (H level) (step S504). Subsequently, the control unit 106 substitutes "0" into a variable "n" adapted to count the number of times of AF evaluation image pickup, thereby initializing (step S505).

Subsequently, as described in FIG. 4, the control unit 106 starts the pickup of the images for AF evaluation (step S506) and starts the pickup of the images for live view in step S516. After the image pickup for AF evaluation is started, the control unit 106 increases the variable n by "1" (step S507). After that, the AF evaluation value detection unit 112 detects an AF evaluation value AF_K in response to the image signal for AF evaluation obtained according to the image pickup for AF evaluation under control by the control unit 106 (step S508).

Subsequently, the control unit 106 discriminates whether or not the AF evaluation value AF_K satisfies the following expression (1), that is, a predetermined evaluation condition with respect to K_min and K_max as AF expected values (step S509).

$$K\_min < AF\_K < K\_max \qquad (1)$$

The AF expected values K_min and K_max indicate a minimum value and a maximum value of the AF evaluation value which is expected and are preliminarily recorded into the control unit 106 at the time of a design of the camera 100 or an adjustment of the camera 100.

When the AF evaluation value AF_K does not satisfy the expression (1) (NO in step S509), the control unit 106 obtains a feedback control amount on the basis of the AF evaluation value AF_K. The control unit 106 drives the drive unit 103 in accordance with the feedback control amount and drives a focus lens provided for the optical mechanism unit 111 along the optical axis (step S510).

Subsequently, the control unit 106 discriminates whether or not the variable (the number of times of AF evaluation image pickup) n is equal to a predetermined number (in this instance, 3) (step S511). If the number of times of AF evaluation image pickup is less than 3 (NO in step S511), the control unit 106 is returned to the processing of step S506 and performs the image pickup for AF evaluation. On the other hand, if the number of times of AF evaluation image pickup is equal to 3 (YES in step S511), the control unit 106 performs the live view display (step S512), thereafter, is returned to the processing of step S505, and sets the number n of times of AF evaluation image pickup to zero.

If the AF evaluation value AF_K satisfies the expression (1) (YES in step S509), the control unit 106 turns off the AF control signal (to the L level) (step S513), and stops the image pickup for AF evaluation in the imaging element 102 (step S514). The control unit 106 displays the image corresponding to the image signal for live view which is picked up to the image display unit 109 (step S515) and enters a standby state.

In the flowchart illustrated in FIG. 5, the control unit 106 stops the image pickup for AF evaluation and, thereafter, displays the image corresponding to the image signal obtained by the pickup of the image for live view of step S516. When the image pickup for live view of step S503 is started, the control unit 106 advances to the processing of step S515 and performs the live view display.

In the first embodiment of the invention, since the image for live view and the image for AF evaluation are simultaneously picked up as mentioned above, a time lag caused at the time of performing the AF evaluation can be shortened. At the time of the AF evaluation, since only the AF evaluation value of the small data capacity is directly sent from the imaging element 102 to the control unit 106, a signal output burden is reduced and the electric power consumption can be decreased.

Although the example in which the AF is performed at the time of live view has been described above in the present embodiment, the above method can be also used to another moving image photographing without limiting to live view. In this instance, the AF evaluation value is directly output from the imaging element 102 to the control unit 106 and the control unit 106 controls the optical mechanism unit 111 by the drive unit 103 in accordance with the AF evaluation value. However, the drive unit 103 may drive the optical mechanism unit 111 in accordance with the AF evaluation value.

As mentioned above, according to the first embodiment of the invention, separately from the image pickup for live view, the image signal of a high frame rate is generated and, at the same time, the imaging element detects the AF evaluation value in accordance with the image signal. Therefore, a data transfer time is shortened and the image quality in the live view does not deteriorate. Consequently, the electric power consumption can be also suppressed.

Second Embodiment

Subsequently, an imaging apparatus having an imaging element according to the second embodiment of the invention will be described. Since a construction of the imaging apparatus according to the second embodiment is similar to that of the camera illustrated in FIG. 1, its description is omitted here. A construction of the imaging element 102 differs from that in the first embodiment (FIG. 2B). The present embodiment will be described hereinbelow with respect to an example of a still image photographing at the time of the photometry operation with a light emitting unit such as a strobe apparatus.

Figure 6:
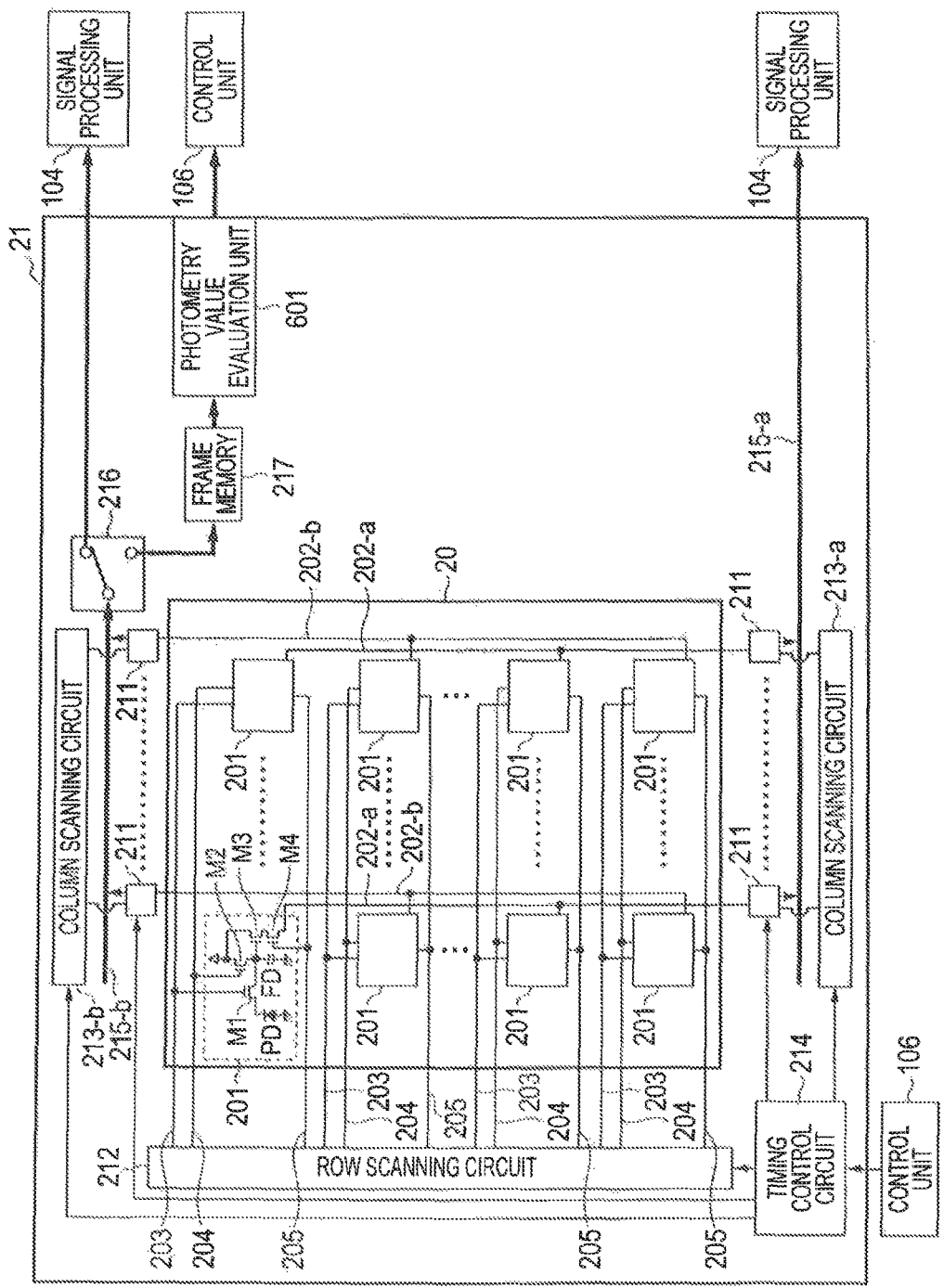
FIG. 6 is a block diagram illustrating a construction of an imaging element according to the second embodiment of the invention.

FIG. 6 is a block diagram illustrating the construction of the imaging element according to the present embodiment. In FIG. 6, substantially the same component elements as those in the imaging element illustrated in FIGS. 2A and 2B are designated by the same reference numerals and their description is omitted here.

In the imaging element 102 illustrated in FIG. 6, the second chip 21 has a photometry value evaluation unit 601 in place of the AF evaluation value detection unit 112. The photometry value evaluation unit 601 is connected to the frame memory 217 and is connected to the control unit 106. In the first chip 20, the photometry value evaluation unit 601 calculates a color ratio and an exposure value as photometry values on the basis of the image signals which are read out through the column signal line 202-b and the horizontal signal line 215-b (that is, channel Ch2). The photometry value evaluation unit 601 outputs photometry control data such as white balance coefficient, light emitting control amount of the light emitting unit 107, and the like to the control unit 106 on the basis of the photometry value. The control unit 106 sends a control command to the signal processing unit 104 and the light emitting unit 107 in accordance with the photometry control data and controls a white balance correction in the signal processing unit 104 and a light emitting amount of the light emitting unit 107.

Figure 7:
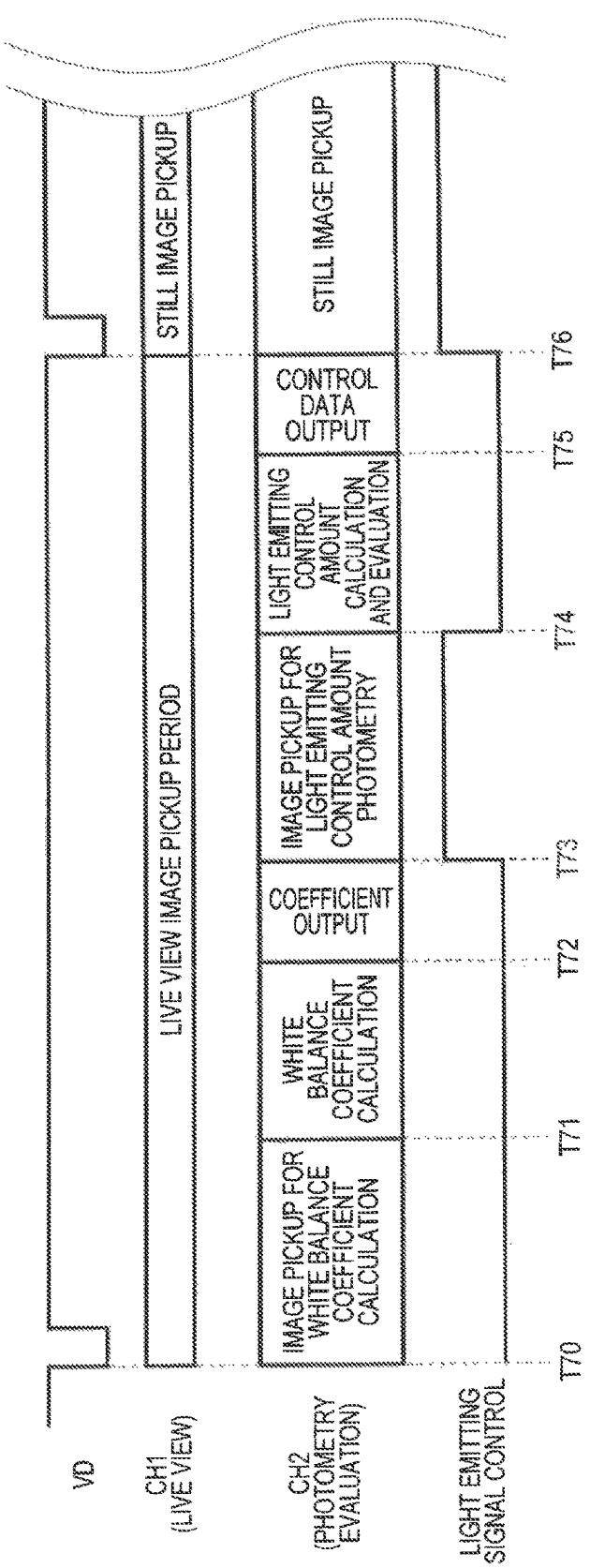
FIG. 7 is a diagram illustrating image pickup timing in a photometry evaluation mode of an imaging apparatus in the second embodiment of the invention.

FIG. 7 is a diagram illustrating image pickup timing in a photometry evaluation mode in the second embodiment.

When the photometry evaluation mode is set, the control unit 106 simultaneously starts the pickup of the image for live view using the channel Ch1 and the pickup of the image for photometry evaluation using the channel Ch2 synchronously with the vertical driving pulse VD in response to a trailing edge of the vertical driving pulse VD at time T70. In the pickup of the image for photometry evaluation, the pickup of the image for photometry evaluation for the white balance coefficient and the light emitting control of the light emitting unit 107 is performed. In this instance, the pickup of the image for photometry evaluation to calculate the white balance coefficient is called "image pickup for white balance coefficient calculation" and the pickup of the image for photometry evaluation to control the light emission is called "image pickup for light emitting control amount photometry".

First, for a period of time of T70~T71, the image pickup for white balance coefficient calculation is performed. At this time, the image signal for white balance coefficient evaluation which is read out of the pixel portion 201 through the channel Ch2 is stored into the frame memory 217 through the horizontal signal line 215-b and the change-over switch 216. For a period of time of T71~T72, the photometry value evaluation unit 601 calculates the white balance coefficient by using the image signal for white balance coefficient evaluation stored in the frame memory 217. After that, for a period of time of T72~T73, the photometry value evaluation unit 601 outputs the white balance coefficient to the control unit 106. The white balance coefficient which is output is used for correction of the white balance of the image signal in the signal processing unit 104.

Subsequently, at time T73, the control unit 106 raises the light emitting control signal (to the H level) and starts the image pickup for light emitting control amount photometry. At time T74, the control unit 106 lowers the light emitting control signal (to the L level) and stops the image pickup for light emitting control amount photometry. Thus, for a period of time of T73~T74, the image pickup for light emitting control amount photometry of the light emitting unit 107 at the time of photographing a still image is performed and the image signal for light emitting control amount evaluation is stored in the light emitting unit 107. For the period of time of T73~T74, since the light emitting control signal is turned on, a previous light emission (that is, pre-emitting of light) by the light emitting unit 107 is performed, and the image pickup for light emitting control amount photometry as an image pickup to calculate an exposure amount of the object is performed.

For a period of time of T74~T75, the photometry value evaluation unit 601 calculates an exposure value regarding the object by using the image signal for light emitting control amount evaluation stored in the frame memory 217 and generates a light emitting control amount on the basis of the exposure value. Subsequently, for a period of time of T75~T76, the photometry value evaluation unit 601 outputs the light emitting control amount to the light emitting control amount control unit 106.

At time T76, the control unit 106 switches the photometry evaluation mode to the still image photographing mode and turns on the light emitting control signal, thereby allowing the light emitting unit 107 to emit light (main emitting of light). At this time, the control unit 106 controls the light emitting amount of the light emitting unit 107 in accordance with the light emitting control amount. Further, the control unit 106 switches the change-over switch 216, outputs the image signal which is output through the channel Ch2 to the signal processing unit 104, and transfers the image signals which are read out of all pixels in the pixel portion 201 to the signal processing unit 104.

In the example illustrated in the diagram, the images for live view of one frame are picked up for the period of time of the one vertical driving pulse VD, and for this period, the image pickup for calculation of the white balance coefficient, the calculation and output of the white balance coefficient, the image pickup for light emitting control amount photometry, and the calculation and output of the light emitting control amount are performed.

In the present embodiment, since the image for live view and the image for photometry evaluation are simultaneously picked up as mentioned above, a time lag caused at the time of performing the photometry evaluation can be shortened. At the time of the photometry evaluation, only the photometry evaluation value (the white balance coefficient and the light emitting control amount) of the small data capacity is directly sent from the imaging element 102 to the control unit 106, the signal output burden is reduced and the electric power consumption can be decreased.

In the present embodiment, the photometry evaluation value is directly sent from the imaging element 102 to the control unit 106 and the control unit 106 controls the signal processing unit 104 and the light emitting unit 107 on the basis of the photometry evaluation value. However, the photometry evaluation value may be transmitted from the imaging element 102 to the signal processing unit 104 and the light emitting unit 107 so that the units 104 and 107 may be directly controlled.

As mentioned above, in the present embodiment, the apparatus is constructed in such a manner that separately from the image pickup for live view, the image signal of the high frame rate is generated by the imaging element and the imaging element calculates the photometry evaluation value by using the image signal. Therefore, not only the data transfer time can be shortened but also the deterioration in image quality in the live view can be prevented and the electric power consumption can be suppressed.

Third Embodiment

Subsequently, the third embodiment of the invention will be described with reference to FIGS. 8A to 11B.

The imaging element illustrated in FIG. 2A has an arrangement implementation in which the first chip 20 is layered on the second chip 21. In the present embodiment, an example of implementation of a signal connection between the first chip 20 and the second chip 21 is shown.

Figure 8A:
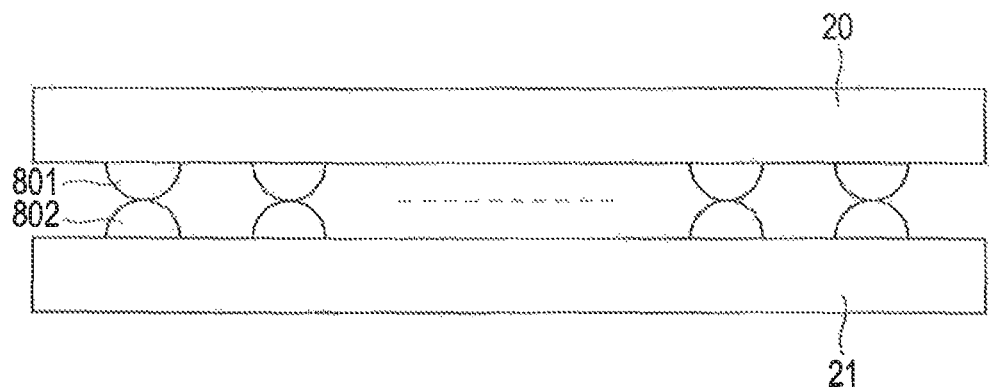
FIGS. 8A and 8B are diagrams illustrating an example of a construction of a layered chip of an imaging element according to the third embodiment of the invention.
Figure 8B:
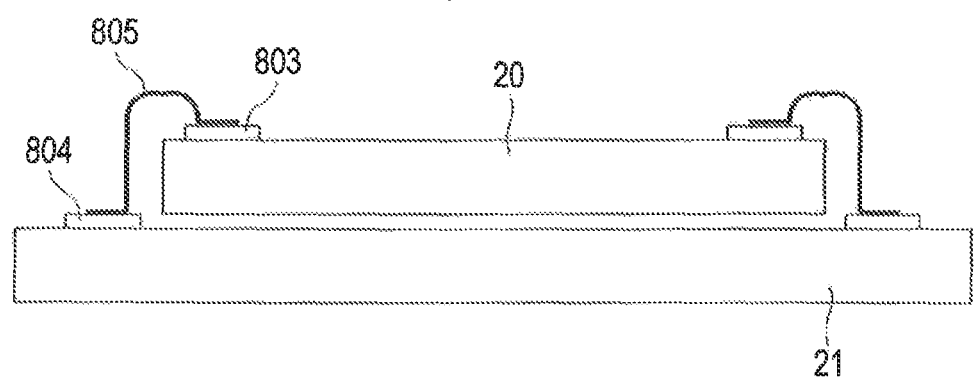

FIGS. 8A and 8B are diagrams illustrating an example of the implementation of the signal connection between the first chip 20 and the second chip 21 in the imaging element according to the third embodiment. FIG. 8A illustrates an example in which electrodes 801 each of which is formed with a projection on the chip 20 and electrodes 802 each of which is formed with a projection on the chip 21 are directly electrically connected and held. FIG. 8B illustrates an example in which electrodes 803 and 804 formed on the chips 20 and 21 are mutually electrically connected by an indirect connection device such as a wire bonding or the like and held. In any one of the above cases, the number of signal lines connected between the chips 20 and 21 is limited to a certain extent due to a restriction of a physical arrangement of the electrodes formed on the chips 20 and 21, or the like. A connection resistance of each of the signal lines connected between the chips 20 and 21 is relatively larger than that of signal wirings in the chips and a delicate analog signal or the like is liable to be influenced by noises due to such a large connection resistance.

In the first and second embodiments, the construction in which the pixel signals which are read out from the pixel portion 201 are transferred, as analog signals, from the chip 20 to the chip 21 through the column signal lines 202-a and 202-b. On the other hand, in the third embodiment, the column ADC 211 disposed on the chip 21 is shifted and arranged to the chip 20 side, and the pixel signals which are transferred from the chip 20 to the chip 21 are replaced by the digital output signal of the column ADC 211, thereby increasing noise immunity.

Subsequently, an imaging apparatus having the imaging element according to the present embodiment will be described. A construction of the imaging apparatus in the present embodiment is similar to that of the first embodiment illustrated in FIG. 1 and a construction of the imaging element 102 differs from that of the imaging element in the first embodiment illustrated in FIG. 2B.

Figure 9:
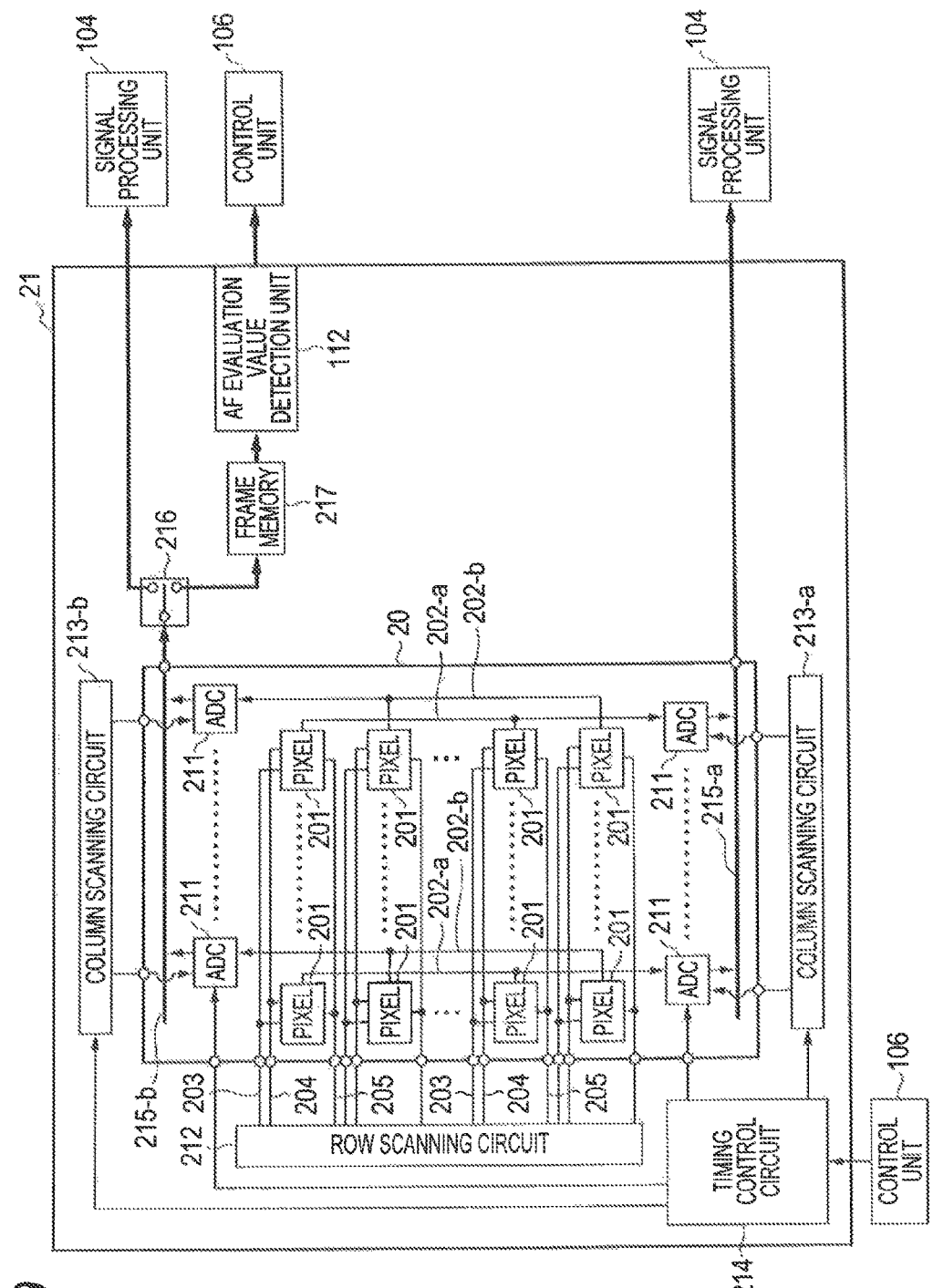
FIG. 9 is a block diagram illustrating a construction of the imaging element according to the third embodiment of the invention.

FIG. 9 is a block diagram illustrating the construction of the imaging element according to the present embodiment. In FIG. 9, substantially the same component elements as those in the imaging element illustrated in FIG. 2A are designated by the same reference numerals and their description is omitted here.

In the imaging element 102 illustrated in FIG. 9, as a connection destination of the column signal lines 202-a and 202-b, the column ADC 211 is disposed on the first chip 20 every column. The output signals of the column ADC 211 are time-sequentially read out to the horizontal signal lines 215-a and 215-b by the column scanning circuits 213-a and 213-b, respectively. The horizontal signal lines 215-a and 215-b are output signal lines from the chip 20. The digital pixel signals which are read out to the horizontal signal line 215-a are sent to the signal processing unit 104 as output signals from the chip 20. On the other hand, the digital pixel signals which are read out to the horizontal signal line 215-b are sent to the switch 216 in the chip 21 as output signals from the chip 20. Since other component elements and their operations are similar to those in the case of the first embodiment, their description is omitted here.

As described above in the first embodiment, by separately performing the image pickup for AF scanning and the image pickup for live view every selected row, the image signals of the frame rates of the different data sizes can be obtained for the different charge accumulation times. Further, if it is intended to raise the frame rate of the image pickup for AF scanning, it is effective that the operation conditions of the column ADC 211 in the image pickup for AF scanning and those in the image pickup for live view are set to different conditions.

FIG. 10 illustrates an example in which the operation conditions such as conversion resolving power [the number of bits], conversion gain [times], conversion time (conversion rate) [µsec], and the like are switched for the column ADC 211 when selecting rows for live view and when selecting rows for AF as illustrated in FIG. 3.

In the example of FIG. 10, as compared with the image pickup for live view, in the image pickup for AF scanning, the conversion resolving power is reduced from 10 bits to 8 bits and the conversion gain (input/output ratio) at the time of AD conversion is switched to a value which is k times as high as that at the time of the image pickup for live view. Unlike the image pickup for live view, according to the image pickup for AF scanning, since an image for display is not formed, if the AF evaluation value can be merely accurately detected, it is not always necessary to certainly maintain the same level as for the conversion resolving power [the number of bits]. Rather than that, a high operation speed owing to the reduction in conversion time is needed in many cases.

By the above construction, according to the AD conversion method, the AD operation speed is raised and while the deterioration in sensitivity due to the short charge accumulation time is compensated, the AD conversion time can be shortened to the time which is k/4 times as large as that in the image pickup for live view. The AD operation will be described in detail hereinafter.

FIGS. 11A and 11B are diagrams illustrating input/output characteristics in the column ADC 211 when selecting the rows for live view (FIG. 11A) and when selecting the rows for AF (FIG. 11B) at this time.

Although the third embodiment is described as an implementation of the signal connection between the first chip 20 and the second chip 21 in the imaging element according to the first embodiment, it may be applied to the imaging element according to the second embodiment.

Fourth Embodiment

Subsequently, a construction of an imaging apparatus having an imaging element according to the fourth embodiment of the invention will be described. Since the construction of the imaging apparatus in the present embodiment is similar to that of the first embodiment (FIG. 1), its description is omitted here. In the present embodiment, a construction of the imaging element differs from that of the imaging element in the first embodiment.

In the third embodiment, the whole circuitry of the column ADC 211 is arranged in the chip 20 and the digital horizontal signal lines 215-a and 215-b are set to the output signal lines from the chip 20, thereby raising the noise immunity of the pixel signals. However, since a scale of the whole circuitry of the column ADC 211 disposed every column is large and the high operation speed is also necessary, it is not so desirable that they are arranged in the chip 20 in which the pixel portion 201 exists. Rather than that, in a digital circuit of a relatively large scale, from a viewpoint of the high operation speed and the low electric power consumption, it is desirable that they are arranged in the chip 21 in which narrowing of the wire width of the circuit elements and wirings can be attained with more possibility than the case of the chip 20 in which the pixel portion 201 exists. Therefore, in the present embodiment, a part of the circuit block of the column ADC 211 is moved into the chip 20 and the signals which are transferred from the chip 20 to the chip 21 are converted into digital signals. By such a construction, while maintaining the noise immunity, an increase in circuit scale in the chip 20 can be prevented.

FIG. 12 is a diagram illustrating an internal construction of the general column ADC 211. In the diagram, a reference voltage as an output of a lump signal generator 1201 is connected to a positive input of a comparator 1204, a signal potential of the analog pixel signal is connected to a negative input of the comparator 1204, and they are compared and discriminated. An output of a counter 1202 for counting a time is connected to a memory 1203 for temporary storage and is held in the memory 1203 at timing of a leading edge of a determination signal serving as an output of the comparator 1204.

Figure 13:
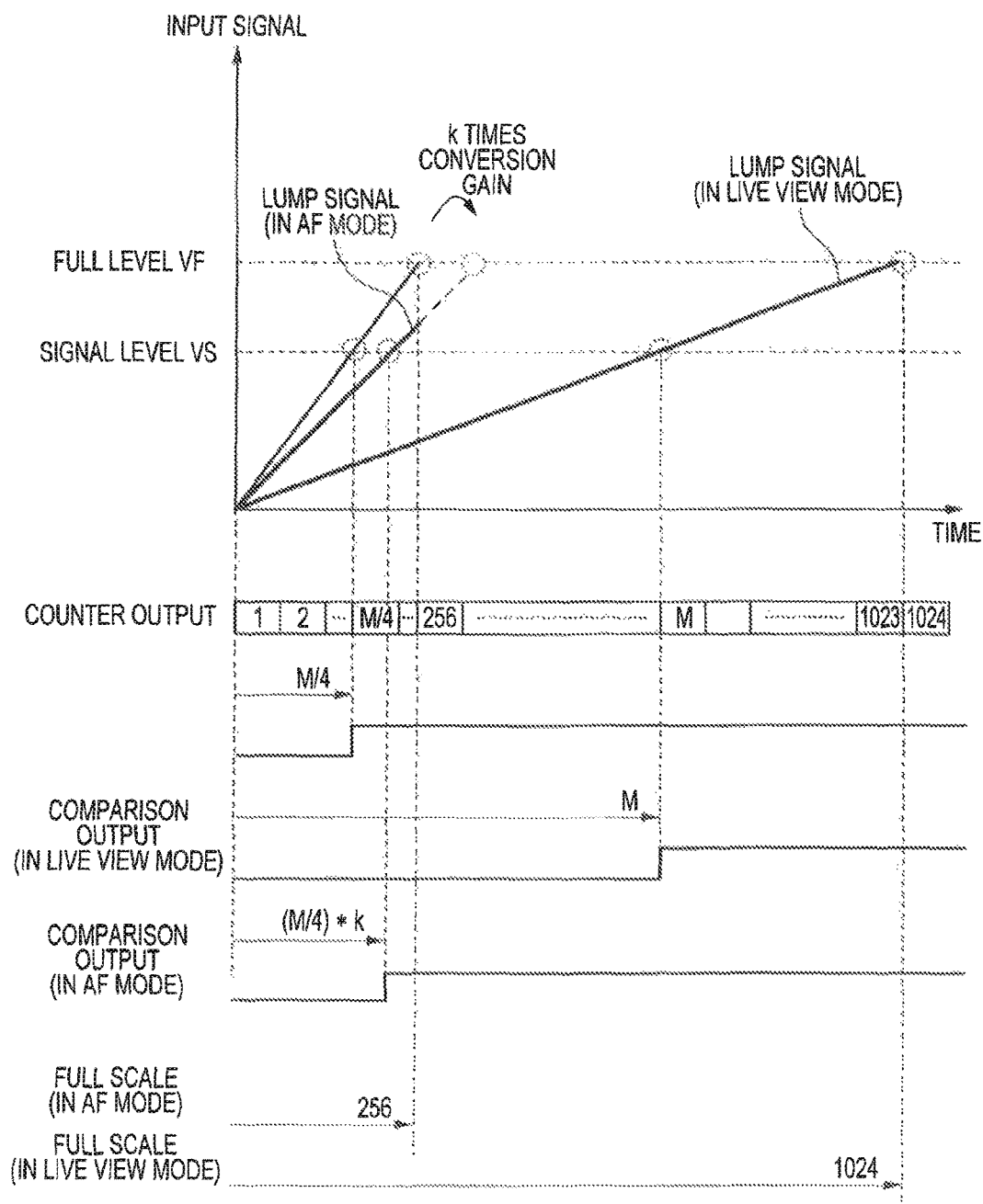
FIG. 13 is a diagram illustrating timing for the operation of a column AD conversion of an imaging element according to the fourth embodiment of the invention.

FIG. 13 is a diagram for describing the AD conversion operation of the column ADC 211. In the diagram, in a graph portion, an axis of abscissa indicates a time and an axis of ordinate indicates a change of an output level of the lump signal generator 1201 which is input to the comparator 1204 and a level of the pixel signal. A pixel signal level VS is decided and a lump signal and the operation of the counter are started from a 0 start point of the time. By holding a counter output at a cross point of the pixel signal level VS and the lump signal, a digital value corresponding to the pixel signal level, that is, an AD conversion value can be obtained.

The resolving power (the number of bits) at the time of the AD conversion can be set by a method whereby a time which is required until the lump signal reaches a full level VF (normally being positioned at neighborhood of a saturation level) of the pixel signal is adjusted by an inclination of a slope of the lump signal. For example, if the resolving power is equal to 10 bits, it is sufficient to set the slope into such an inclination that the time (count number) which is required until the lump signal reaches the full level VF is equal to 1024 (=$2^{10}$). By decreasing the inclination of the slope of the lump signal, the conversion gain can be also raised.

In the example of FIG. 13, at the time of the image pickup for live view and at the time of the image pickup for AF scanning, the inclination of the slope of the lump signal is adjusted and AD conversion conditions similar to those shown in FIG. 10 are switched. That is, at the time of the image pickup for live view, the resolving power of the AD conversion is switched to 10 bits, and at the time of the image pickup for AF scanning, the resolving power is switched to 8 bits. Further, by decreasing the inclination of the slope of the lump signal so that the lump signal is multiplied by a predetermined gain k [times], the conversion gain which is (k/4) times as large as that in the case of the image pickup for live view is obtained and the conversion time of (k/4) times is shortened.

Figure 14:
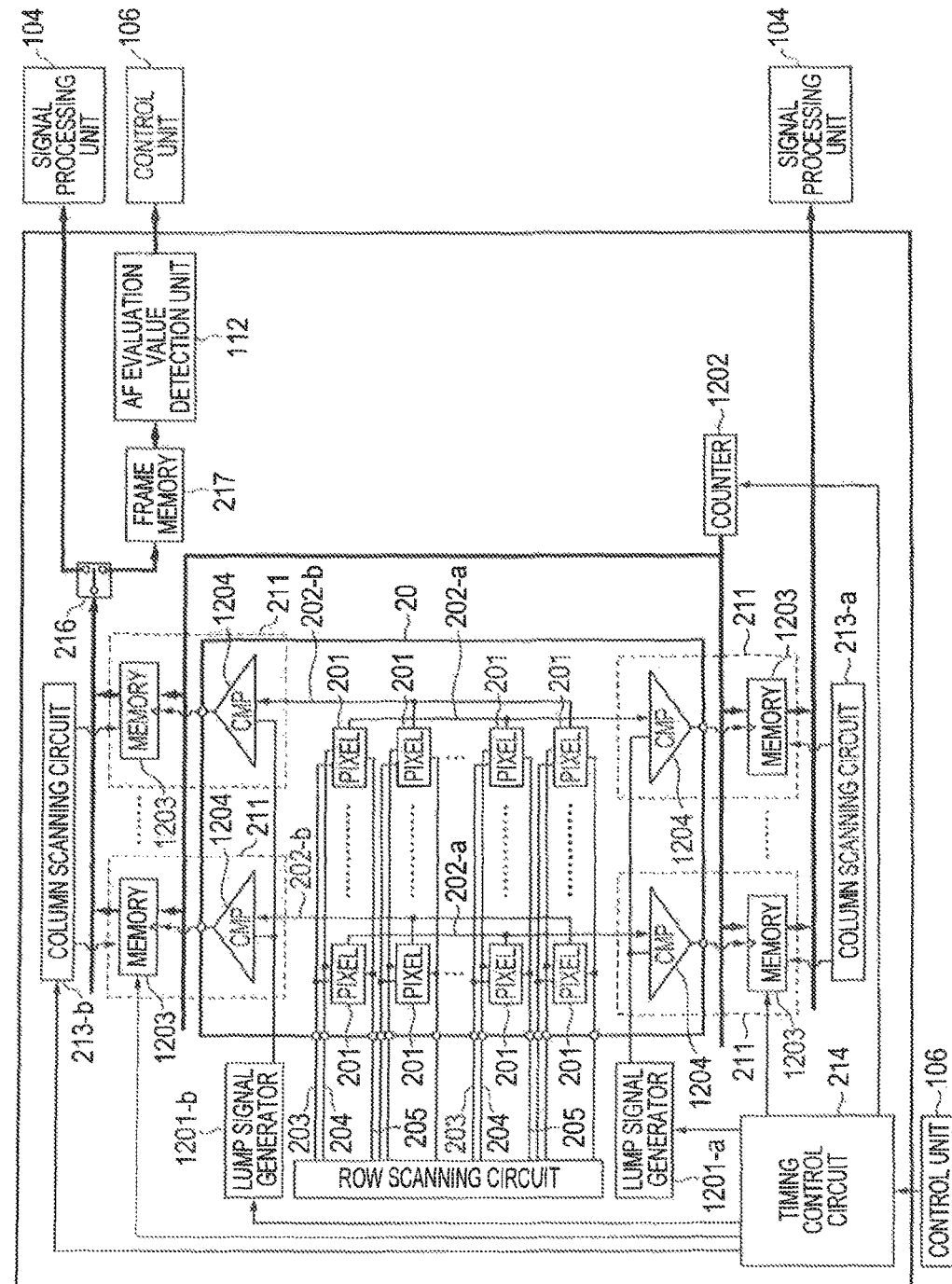
FIG. 14 is a block diagram illustrating a construction of the imaging element according to the fourth embodiment of the invention.

FIG. 14 is a block diagram illustrating the construction of the imaging element according to the present embodiment. In FIG. 14, substantially the same component elements as those in the imaging element illustrated in FIG. 2A are designated by the same reference numerals and their description is omitted here.

In the imaging element 102 illustrated in FIG. 14, as a connection destination of the column signal lines 202-a and 202-b, the comparator 1204 forming a part of the circuit construction of the column ADC 211 is disposed in the first chip 20 every column. In a manner similar to the construction illustrated in FIG. 12, the column ADC 211 is constructed by the lump signal generator 1201, counter 1202, memory 1203 for temporary storage, and comparator 1204 and all of the component elements other than the comparator 1204 are disposed in the second chip 21.

Two generators such as lump generator 1201-a for generating a reference signal of the column signal line 202-a and lump generator 1201-b for generating a reference signal of the column signal line 202-b are disposed for the lump generator 1201, and each reference signal is sent to the corresponding comparator of each column. An output of the comparator 1204 is output every column as an output signal line from the chip 20 and is transferred to a control terminal of the corresponding memory 1203 for temporary storage disposed on the chip 21 every column.

An output of the counter 1202 which is common to all columns is sent to a data input terminal of the memory 1203 for temporary storage. The counter output is held in accordance with the timing of the output of the comparator 1204 of each column. Data outputs of the memories 1203 for temporary storage of each column are time-sequentially read out to the horizontal signal lines 215-a and 215-b by the column scanning circuits 213-a and 213-b. The horizontal signal lines 215-a and 215-b are output as output signal lines from the chip 20, respectively. The digital pixel signals which are read out to the horizontal signal line 215-a are sent to the signal processing unit 104 as output signal lines from the chip 20. The digital pixel signals which are read out to the horizontal signal line 215-b are sent to the switch 216 in the chip 21 as output signal lines from the chip 20. Since other component elements and their operations are substantially similar to those in the case of the foregoing first embodiment, their description is omitted here.

Fifth Embodiment

Subsequently, a construction of an imaging apparatus having an imaging element according to the fifth embodiment of the invention will be described. Since the construction of the imaging apparatus in the present embodiment is similar to that of the first embodiment illustrated in FIG. 1, its description is omitted here. In the present embodiment, a construction of the imaging element 102 differs from that of the imaging element in the first embodiment.

The fifth embodiment has a construction in which circuits necessary at the time of the image pickup for AF scanning are inserted in the chip 20. By this construction, such a structure that the pixel signals at the time of the image pickup for AF scanning are output from the chip 20 is avoided, thereby reducing the number of signal lines and enabling an influence of noises on the pixel signals at the time of the image pickup for AF scanning to be eliminated.

Figure 15:
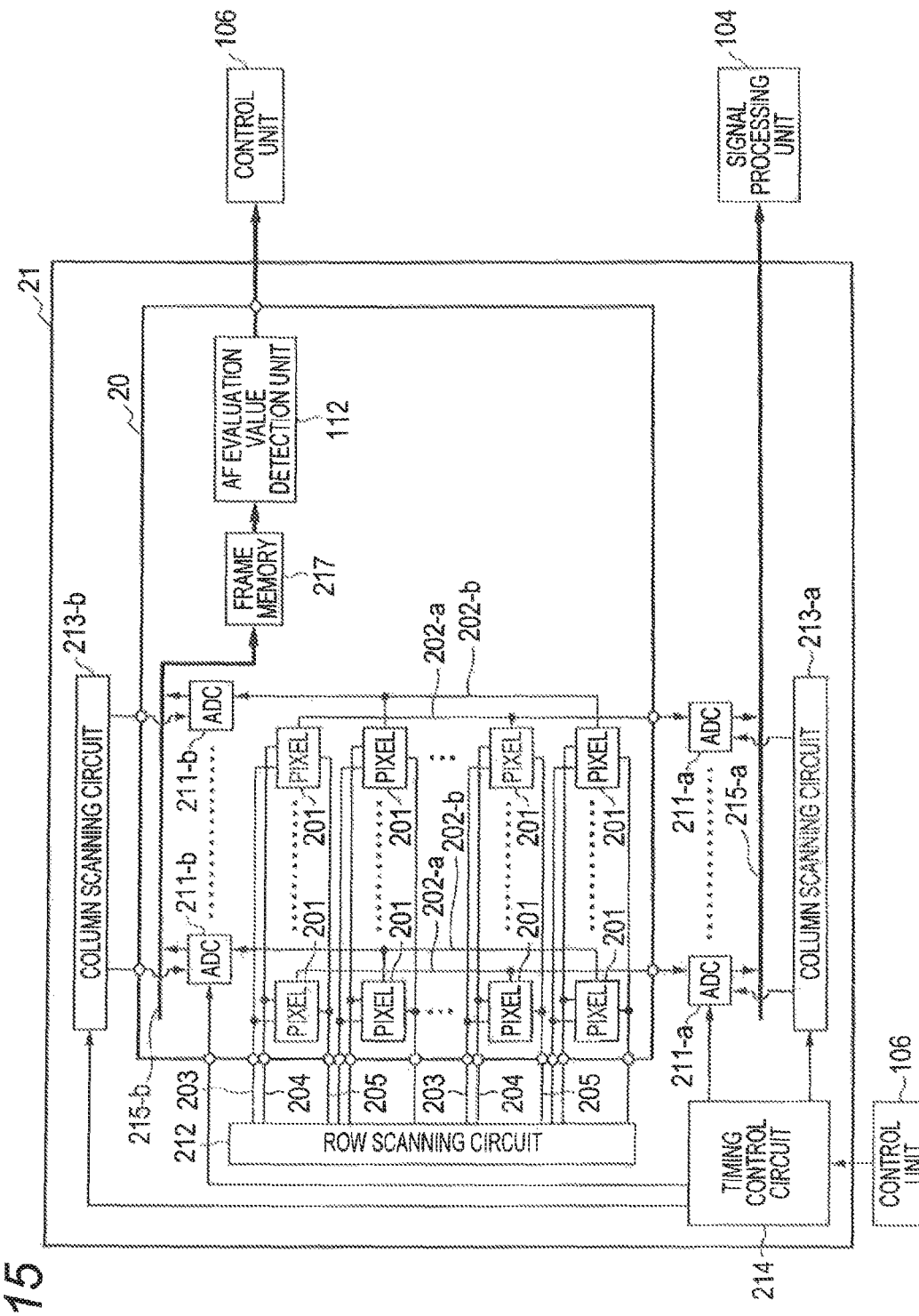
FIG. 15 is a block diagram illustrating a construction of an imaging element according to the fifth embodiment of the invention.

FIG. 15 is a block diagram illustrating the construction of the imaging element according to the present embodiment. In FIG. 15, substantially the same component elements as those in the imaging element illustrated in FIG. 2A are designated by the same reference numerals and their description is omitted here.

In FIG. 15, as a connection destination of the column signal line 202-a, a column ADC 211-a is disposed on the second chip 21 every column and the column signal line 202-a is connected to the chip 21 as an output signal line from the chip 20. Output signals of the column ADC 211-a are time-sequentially read out to the horizontal signal line 215-a by the column scanning circuit 213-a. The horizontal signal line 215-a is guided to the signal processing unit 104 as an output signal line from the chip 21. On the other hand, as a connection destination of the column signal line 202-b, a column ADC 211-b is disposed on the first chip 20 every column. Output signals of the column ADC 211-b are time-sequentially read out to the horizontal signal line 215-b by the column scanning circuit 213-b.

The frame memory 217 and the AF evaluation value detection unit 112 are further disposed on the chip 20. Thus, the digital pixel signals which are read out to the horizontal signal line 215-b are supplied to the frame memory 217 and the AF evaluation value is detected in the chip 20 by the AF evaluation value detection unit 112. The detected AF evaluation value is sent to the control unit 106 as an output signal from the chip 20.

If the column ADC 211-b, frame memory 217, AF evaluation value detection unit 112, and the like as circuits which are necessary at the time of image pickup for AF scanning are arranged in the chip 20 in which the pixel portion 201 exists, a circuit scale of the chip 20 increases. Such a construction is not so desirable from a viewpoint of realization of low electric power consumption. Therefore, when those circuits are arranged in the chip 20, a device to reduce the circuit electric power is also necessary.

For this purpose, also in the present embodiment, by a method similar to that in the third or fourth embodiment, the operation conditions are switched for the column ADC 211-a when selecting the rows for live view and the column ADC 211-b when selecting rows for AF, respectively. By this method, owing to the reduction of the conversion time in the column ADC 211-b when selecting rows for AF, the electric power of the column ADC 211-b of each column after the conversion is saved and the electric power in the chip 20 can be reduced by an amount corresponding to the saved power.

As for the frame memory 217, it is necessary to set the minimum memory capacity which is limited to the evaluation area of the image pickup signal for AF scanning. As for the AF evaluation value detection unit 112 as well, it is necessary to design a logic in which the circuit scale and the electric power consumption are suppressed.

Although the invention has been described above with respect to the embodiments, the invention is not limited to those embodiments but various modifications within a range without departing from the essence of the invention are also incorporated in the invention.

For example, as a control method of the functions of the foregoing embodiments, it is sufficient that the control unit controls each unit of the imaging apparatus so as to execute those functions. It is also possible to allow a computer provided for the imaging apparatus to execute the programs having the functions of the foregoing embodiments as a control program. The control program is recorded into, for example, a computer-readable storage medium. Each of the foregoing control method and the control program has at least a control step and a display control step.

Other Embodiments

Embodiments of the present invention can also be realized by a computer of a system or apparatus that reads out and executes computer-executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer-executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention is described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-137064, filed on Jun. 28, 2013, which is hereby incorporated by reference herein in its entirety.

What is claimed is:

1. An imaging element having a stacked structure which includes a first substrate having a pixel portion in which pixels for photoelectrically converting an optical image of an object and generating pixel signals are arranged and a second substrate having a first output path for outputting first pixel signals of a first pixel group in the pixel portion and a second output path for outputting second pixel signals of a second pixel group, the imaging element comprising:
   converters which convert the first pixel signals and the second pixel signals into digital signals,
   wherein a conversion rate of the first pixel signals by the converters is higher than a conversion rate of the second pixel signals by the converters.

2. The imaging element according to claim 1, wherein a conversion resolution of the first pixel signals by the converters is lower than a conversion resolution of the second pixel signals by the converters.

3. The imaging element according to claim 1, wherein a conversion gain of the first pixel signals by the converters is higher than a conversion gain of the second pixel signals by the converters.

4. The imaging element according to claim 1, wherein a conversion resolution and a conversion gain of pixel signals by the converters is adjusted by adjusting a slope of a lamp signal of the converters.

5. The imaging element according to claim 1, further comprising a driver which drives the pixel portion, wherein the driver is arranged in the second substrate.

6. The imaging element according to claim 1, wherein at least a part of each of the converters is arranged in the first substrate.

7. The imaging element according to claim 1, further comprising a control information generator which generates control information for a photographing operation by using digital signals converted by the converters.

8. The imaging element according to claim 7, further comprising a switch which selectively outputs the digital signal from the first output path to the control information generator.

9. The imaging element according to claim 7, wherein at least a part of each of the converters is arranged in the first substrate and the control information generator is arranged in the second substrate.

10. The imaging element according to claim 7, wherein the control information generator is arranged in the first substrate.

11. The imaging element according to claim 1, further comprising a connecter electrically connecting the first substrate and the second substrate, wherein the first substrate is located on a light receiving side of the imaging element.

12. The imaging element according to claim 7, wherein the control information generator generates a focus evaluation value, as the control information.

13. The imaging element according to claim 7, wherein the control information generator generates a white balance coefficient, as the control information, which is used when performing a white balance correction.

14. The imaging element according to claim 1, wherein the converters comprises a plurality of comparators which compare the pixel signals and a reference voltage, and a plurality of counters which count a time on the basis of outputs of the comparators,
at least a part of the plurality of comparators are included in the first substrate, and
the plurality of counters corresponding to the outputs of the comparators included in the first substrate are included in the second substrate.

15. An imaging apparatus comprising:
an imaging element having a stacked structure which includes a first substrate having a pixel portion in which pixels for photoelectrically converting an optical image of an object and generating pixel signals are arranged, a second substrate having a first output path for outputting first pixel signals of a first pixel group in the pixel portion and a second output path for outputting second pixel signals of a second pixel group, and converters which convert the first pixel signals and the second pixel signals into digital signals, wherein a conversion rate of the first pixel signals by the converters is higher than a conversion rate of the second pixel signals by the converters; and
a controller which controls driving of the imaging element.

16. The imaging apparatus according to claim 15, wherein a conversion resolution of the first pixel signals by the converters is lower than a conversion resolution of the second pixel signals by the converters.

17. The imaging apparatus according to claim 15, wherein a conversion gain of the first pixel signals by the converters is higher than a conversion gain of the second pixel signals by the converters.

18. The imaging apparatus according to claim 15, wherein a conversion resolution and a conversion gain of pixel signals by the converters is adjusted by adjusting a slope of a lamp signal of the converters.

19. The imaging apparatus according to claim 15, further comprising a display which displays an image on the basis of digital signals output from the first output path of the imaging element.

20. The imaging apparatus according to claim 15, wherein the controller controls the read-out of pixel signals from the pixel portion so that the first pixel signals of the first pixel group are read out through the first output path at a first frame rate, and the second pixel signals of the second pixel group are read out through the second output path at a second frame rate lower than the first frame rate.

21. The imaging apparatus according to claim 15, further comprising a control information generator configured to generate control information for a photographing operation by using digital signals converted by the converters.

22. The imaging apparatus according to claim 21, wherein the control information generator generates a focus evaluation value, as the control information.

23. The imaging apparatus according to claim 21, further comprising a signal processing unit configured to process digital signals from the second output path, wherein
the control information generator generates a white balance coefficient, as the control information, which is used when performing a white balance correction, and the signal processing unit corrects pixel signals from the second output path on the basis of the white balance coefficient.

24. The imaging apparatus according to claim 15, further comprising, in the imaging element, a switch which selectively outputs digital signals from the first output path to the control information generator.

* * * * *